(12) United States Patent
Bybee et al.

(10) Patent No.: US 7,020,463 B2
(45) Date of Patent: Mar. 28, 2006

(54) METHODOLOGY FOR MOBILE USER TERMINALS IN BROADBAND SYSTEMS

(75) Inventors: Michael F. Bybee, Redondo Beach, CA (US); Jeffrey J. Gold, Rancho Palos Verdes, CA (US); Marc J. Halcomb, Fullerton, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 581 days.

(21) Appl. No.: 09/967,616

(22) Filed: Sep. 28, 2001

(65) Prior Publication Data

US 2002/0128018 A1 Sep. 12, 2002

Related U.S. Application Data

(60) Provisional application No. 60/275,082, filed on Mar. 9, 2001.

(51) Int. Cl.
*H04Q 7/20* (2006.01)

(52) U.S. Cl. ................. 455/428; 455/456.1; 455/452.2

(58) Field of Classification Search ............ 455/556.1, 455/556.2, 556.3, 440, 457, 436–443, 456.1–456.3, 455/427–430, 455, 422.1, 452.2; 370/331, 370/338, 401, 352
See application file for complete search history.

(56) References Cited

U.S. PATENT DOCUMENTS

| 5,572,216 | A | | 11/1996 | Weinberg et al. |
| RE35,916 | E | | 10/1998 | Dennison et al. ............ 455/456 |
| 5,893,033 | A | | 4/1999 | Keskitalo et al. ........... 455/437 |
| 5,946,618 | A | | 8/1999 | Agre et al. .................. 455/428 |
| 6,138,021 | A | * | 10/2000 | Arrington et al. .......... 455/436 |
| 6,141,534 | A | * | 10/2000 | Snell et al. ............... 455/452.2 |
| 6,400,941 | B1 | * | 6/2002 | Nara ....................... 455/422.1 |
| 6,539,230 | B1 | * | 3/2003 | Yen .......................... 455/456.1 |
| 6,546,258 | B1 | * | 4/2003 | Nohara et al. ........... 455/456.1 |
| 6,587,446 | B1 | * | 7/2003 | Sarkar et al. ............... 370/331 |
| 6,625,457 | B1 | * | 9/2003 | Raith ....................... 455/456.1 |
| 6,721,572 | B1 | * | 4/2004 | Smith et al. ............. 455/456.1 |
| 6,804,492 | B1 | * | 10/2004 | Kay ........................... 455/427 |

FOREIGN PATENT DOCUMENTS

| EP | 0 655 871 A1 | 5/1995 |
| WO | WO 00/21217 | 4/2000 |
| WO | WO 00/69094 | 11/2000 |

* cited by examiner

*Primary Examiner*—Sonny Trinh
(74) *Attorney, Agent, or Firm*—Georgann S. Grunebach

(57) ABSTRACT

A broadband system wherein a mobile user terminal determines a cell set connection with a communications platform using location information provided by a navigation device on said mobile user terminal and a stored database containing a current cell topology for the communications platform.

17 Claims, 1 Drawing Sheet

METHODOLOGY FOR MOBILE USER TERMINALS IN BROADBAND SYSTEMS

RELATED APPLICATIONS

This application claims the benefit of earlier filed provisional patent application entitled "Methodology For Mobile User Terminals In Broadband Systems", Ser. No. 60/275,082, filed on Mar. 9, 2001.

TECHNICAL FIELD

The present invention relates generally to point-to-point broadband systems and more particularly to bandwidth assignment in a point-to-point broadband system.

BACKGROUND OF THE INVENTION

Broadband systems typically have access terminals with fixed, or relatively fixed, locations. Links to and from the satellite are tightly controlled and static. This arrangement does not support a mobile terminal. In prior art systems designed for mobile terminals, signals are routed based upon signal strength and without prior knowledge of the allocation of system resources.

Generally, point-to-point systems do not track mobile terminals. The complexity associated with tracking and dynamically allocating routing mechanisms may overwhelm on-board processing capabilities or result in processing delays at the centralized network control center.

SUMMARY OF THE INVENTION

It is an object of the present invention to allow a satellite containing multiple high-gain spot beams to provide point-to-point broadband service to or from a moving platform, such as a plane or a car. It is another object of the present invention to distribute bandpass capacity on a dynamic user defined basis.

It is still another object of the present invention to alleviate the need for a spacecraft to track mobile user terminals for point-to-point applications. Yet another object of the present invention is to perform allocation of uplink spectrum and spot beams on a priority basis, as moving user terminals alter traffic patterns. A further object of the present invention allows a central processing facility or communications platform to allocate spectrum and spot beams.

According to the present invention, a communications platform having a plurality of high-gain spot beams receives navigational information from a mobile user terminal. The mobile user terminal determines which of the spot beams downlink cells of the communications platform is the most appropriate for downlink to the mobile user terminal. The mobile user terminal maintains a database of the communications platform uplink and downlink geographic cell mapping to determine which cell set it is located within and which cell set it is transitioning into. It is possible to periodically update the cell mapping information stored in the mobile user terminal.

It is an advantage of the present invention that it is not necessary for the communications platform to track a mobile user terminal for point-to-point applications. It is another advantage of the present invention that the communications platform does not need to be aware of the location of all of its user terminals.

According to the present invention, the user terminal determines which uplink carrier and downlink cell will be used for transmission or reception. Therefore, it is a further advantage of the present invention that the need for onboard processing or centralized processing may be eliminated, increasing the flexibility and simplicity of the communications platform system.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
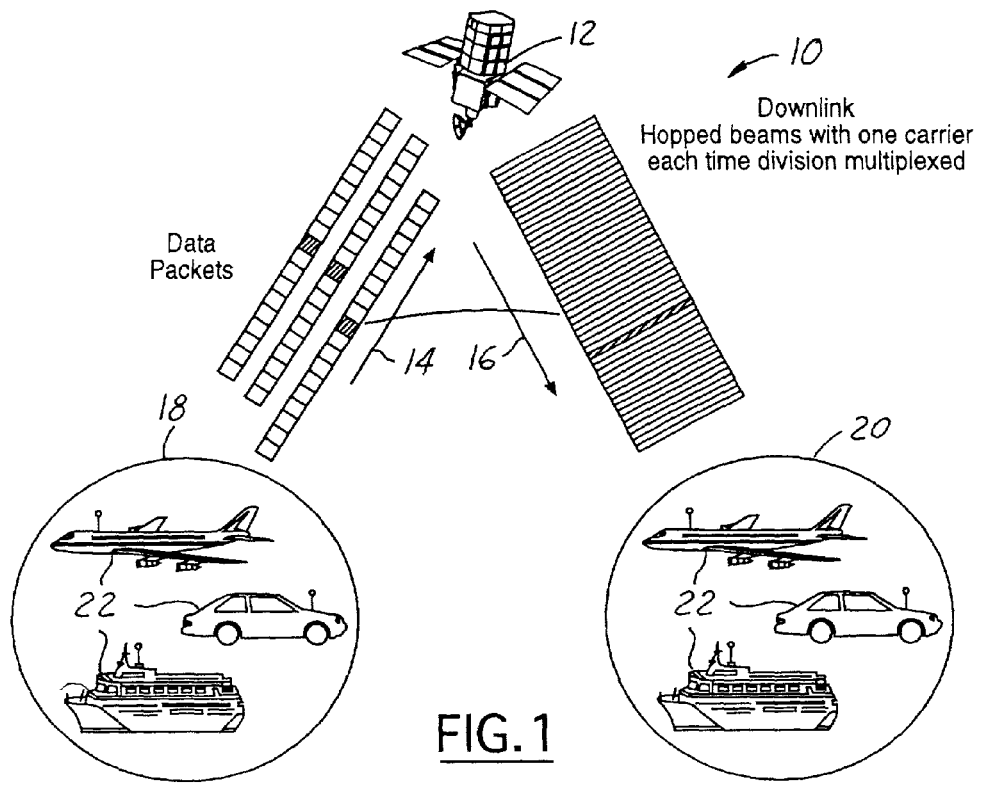
FIG. 1 is a block diagram of the communications platform system of the present invention.

FIG. 1 is a block diagram of a communications platform system 10 according to the present invention. A communications platform 12, shown as a satellite in FIG. 1, but which may also be a stratospheric platform or other platform, provides uplink 14 and downlink 16 capabilities between user terminals 18 and 20. A user terminal 18, 20 may be any end user of satellite services, and may be fixed, or mobile, such as services to a plane, car, boat or other mobile vehicle as shown in FIG. 1.

According to the present invention, the mobile user terminal 18, 20 is equipped with a navigational device 22, such as a global positioning system (GPS) receiver. The navigational device 22 provides location information that is communicated by the mobile user terminal 18, 20 to the communications platform 12. The location information provided to the mobile user terminal 18, 20 allows the terminal 18, 20 to determine which of the high gain spot beams of the communications platform 12 is most appropriate for the downlink and to determine which channel configuration is most appropriate for the uplink.

According to the present invention, the user terminal 18, 20 retains a database of the communications platform 12 uplink and downlink geographic cell mapping.

The navigational device 22 provides location information that the user terminal 18, 20 incorporates into a header field of the uplinked packets or in a special information packet. The user terminal 18, 20 uses its known location and accesses its database of geographic cell mapping for the communications platform 12 to determine which cell set (uplink and downlink) it is contained within and which cell set it is transitioning into. For example, a sending mobile user terminal 18 will use its known location to determine which cell set it is contained within for uplinking information to the satellite and ultimately downlinking from the communications platform 12. User terminal 20 uses its known location and database to determine a cell set so that the satellite 12 can downlink the data packets from mobile user terminal 18 to mobile user terminal 20.

In this regard, the communications platform 12 receives location information for the mobile user terminals and is therefore capable of anticipating new bandwidth and cell assignments as the user terminal transitions from one uplink/ downlink cell to another and will allow return messages to be routed to the proper downlink locations. However, it is not necessary for the communications platform 12 to be aware of the location of all of its users at any given time. It is only necessary to communicate location information during transmission in order for the satellite to know which cells are being used for uplink and to know where to transmit the uplinked data packets.

Figure 2:
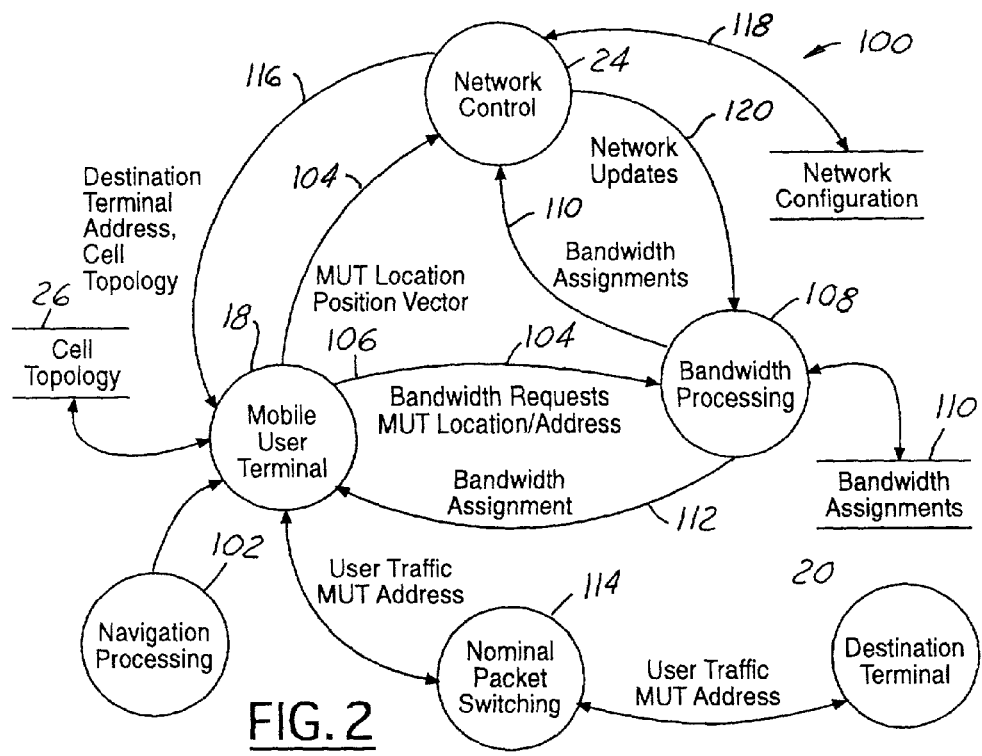
FIG. 2 is a flow diagram of the methodology of the present invention.

FIG. 2 is a flow diagram of the method 100 according to the present invention. The system generally has at least one mobile user terminal 18, and a communications platform (not shown in FIG. 2). Optionally, the system may include a network control center 24. However, network control is not necessary as part of the system or method of the present invention.

The mobile user terminal (MUT) 18 holds the cell topology 26 for the communications platform. This can be updated periodically 116 from the network control center 24 or by any known method. The mobile user terminal 18 also has navigational processing capabilities 102 to determine and communicate location information 104, in the form of a position vector, to the communications platform and/or the optional control network 24. The mobile user terminal will configure itself and request 106 uplink bandwidth as a function of its location and the database cell topology 24.

The bandwidth request 106 is processed 108 on board the communications platform and a bandwidth assignment 110 is determined and communicated 112 to the mobile user terminal 18 establishing an uplink connection with the communications platform.

Ongoing mobile terminal to mobile terminal traffic is maintained because the source mobile user terminal 18 includes its current address information in the header. In this regard, the communications platform does not need to know the location of each of the mobile user terminals.

In one embodiment of the present invention, the mobile user terminal 18, 20 may provide look ahead positional information 104 as to its estimated position in a predetermined time interval. It may also provide its current speed as well as a directional vector along with the positional information 104. The estimated positional information may be contained with the uplink packet header or as a special information packet. Providing this information 104 to the optional network control 24 allows the network control center 24 to predict near term system performance and will allow destination terminals to establish a communications link at a later time.

The optional ground-based network control center 24 is not necessary. However, the system of the present invention does not preclude the ability to have a centralized location to determine geographic cell assignment of a mobile user terminal given the uplinked information provided by the user terminal. Having the network control center 24 allows for greater centralized controls. The network control center introduces efficiencies in that there is less distribution processing required between the mobile user terminals and the communications platform.

The ground-based network control center also maintains the network configuration 118 for the communications platform. Network updates are sent 120 to the communications network to assist in processing bandwidth requests and assignments.

In yet another embodiment of the present invention the system will broadcast a message requesting a "lost" mobile user terminal to wake up and reply with a response if its destination cell is unknown or otherwise inoperative. The requested information may be relayed to a database in the network control center 24 where it can be accessed by other mobile user terminals that wish to establish a link with the "lost" terminal.

The invention covers all alternatives, modifications, and equivalents, as may be included within the spirit and scope of the appended claims.

What is claimed is:

1. A broadband system comprising:
   a communications platform having a plurality of uplink and downlink cell sets;
   at least one user terminal having a navigational device for providing location information and a database of a cell topology for said communications platform;
   said at least one user terminal determines an uplink and downlink cell set for connection with said communications platform based on a predetermined cell set chosen from said database and depending on said location information provided by said navigational device, said at least one user terminal terminating a connection with said communications platform on said predetermined cell set and wherein said at least one user terminal re-establishes a connection with said communications platform on another predetermined cell set chosen from said database depending on updated location information provided by said navigational device on said at least one user terminal; and
   a network control center in communication with said at least one user terminal and said communications platform wherein said network control center provides said at least one user terminal with updates to said cell topology and prioritizes bandwidth assignment for said communications platform.

2. A method for enabling at least one mobile user terminal to receive and transmit broadband data to and from a communications platform, said method comprising the steps of:
   obtaining location information from a navigational device on said user terminal;
   determining a cell set from a database of a cell topology, for the communications platform, said database being stored in said user terminal;
   establishing an uplink/downlink connection between said communications platform and said user terminal using said determined cell set by said user terminal requesting a bandwidth assignment for said determined cell set from said communications platform and allocating a bandwidth assignment to said user terminal for said determined cell set;
   said at least one user terminal obtaining updated location information from said navigational device on said user terminal;
   said at least one user terminal updating a cell set from said database of said cell topology for said communications platform based on said updated location information;
   said at least one user terminal terminating said uplink/downlink connection;
   said at least one user terminal re-establishing an uplink/downlink connection between said communications platform and said at least one user terminal using said updated cell set;
   providing estimated positional information in a predetermined time interval;
   providing a current speed of said at least one mobile terminal; and
   providing a directional vector of said at least one mobile terminal.

3. The method as claimed in claim 2 wherein said step of allocating a bandwidth further comprises the steps of:
- processing said bandwidth request on board said communications platform;
- determining a bandwidth assignment based on said request; and
- communicating said bandwidth assignment to said user terminal.

4. The method as claimed in claim 3 further comprising the step of moving data packets between said sending user terminal and a destination user terminal.

5. The method as claimed in claim 2
- wherein a central network control center is in communication with said mobile user terminal and said communications platform, said method further comprises the steps of:
- maintaining a current cell topology for said communications platform at said central network control center;
- maintaining a current network configuration for said communications platform at said central network control center;
- updating the database on said user terminal with said current cell topology;
- sending updates of said current network configuration to said communications platform; and
- assigning a priority to bandwidth assignments communicated by said communications platform.

6. The method as claimed in claim 5 further comprising the step of requesting a user terminal to reply to said control network center with a response if said location information is unavailable.

7. The method as claimed in claim 6 further comprising the step of providing a destination terminal address to a sending user terminal from said network control center.

8. A method for enabling at least one user terminal to receive and transmit broadband data to and from a communications platform having a network control center, said method comprising the steps of:
- obtaining location information from a navigational device on said at least one user terminal;
- storing a database of a current cell topology for said communications platform on said user terminal;
- determining cell set for uplink/downlink connection to said communications platform, said cell set being determined from said database and said location information for said at least one user terminal;
- establishing an uplink/downlink connection between said at least one user terminal and said communications platform;
- said at least one user terminal obtaining updated location information from said navigational device on said user terminal;
- said at least one user terminal updating a cell set form said database of said cell topology for said communications platform based on said updated location information;
- said at least one user terminal terminating said uplink/downlink connection
- said at least one user terminal re-establishing an uplink/downlink connection between said communications platform and said at least one user terminal using said updated cell set;
- sending a request for bandwidth assignment from said at least one user terminal to said communications platform;
- processing said request for bandwidth assignment; and
- allocating a bandwidth assignment to said at least one user terminal.

9. The method as claimed in claim 8 wherein said step of processing said request for bandwidth assignment further comprises processing said request on board said communications platform.

10. The method as claimed in claim 8 wherein said step of processing said request for bandwidth further comprises processing said request at said network control center.

11. The method as claimed in claim 8 further comprising the step of providing an address for a destination user terminal to a sending user terminal.

12. The method as claimed in claim 11 wherein said destination user terminal address is provided by said network control center.

13. The method as claimed in claim 12 wherein said destination user terminal address is communicated by way of said communications platform.

14. The method as claimed in claim 8 further comprising the step of requesting a destination user terminal to reply to said communications platform with a response when said location information is unavailable.

15. The method as claimed in claim 8 further comprising the step of updating said database on said user terminal from said network control center.

16. The method as claimed in claim 8 further comprising the step of updating a network configuration on said communications platform from said network control center.

17. The method as claimed in claim 8 further comprising the step of assigning a priority to bandwidth assignments made by said network control center and communicated by said communications platform.

* * * * *